(12) United States Patent
Ikeda et al.

(10) Patent No.: US 10,397,333 B2
(45) Date of Patent: Aug. 27, 2019

(54) RECORDING/REPRODUCING APPARATUS WITH WIRELESS LAN FUNCTION

(71) Applicant: TEAC Corporation, Tokyo (JP)

(72) Inventors: Tomohiro Ikeda, Tokyo (JP); Nobukazu Kadogaki, Tokyo (JP)

(73) Assignee: TEAC CORPORATION, Tokyo (JP)

( * ) Notice: Subject to any disclaimer, the term of this patent is extended or adjusted under 35 U.S.C. 154(b) by 0 days.

(21) Appl. No.: 14/973,153

(22) Filed: Dec. 17, 2015

(65) Prior Publication Data

US 2016/0179457 A1 Jun. 23, 2016

(30) Foreign Application Priority Data

Dec. 18, 2014 (JP) .................. 2014-256193

(51) Int. Cl.
| | |
|---|---|
| *G06F 17/00* | (2019.01) |
| *H04L 29/08* | (2006.01) |
| *H04M 1/725* | (2006.01) |
| *G08C 17/02* | (2006.01) |
| *G06F 3/16* | (2006.01) |
| *H04W 84/12* | (2009.01) |

(52) U.S. Cl.
CPC ............ *H04L 67/125* (2013.01); *G06F 3/165* (2013.01); *G08C 17/02* (2013.01); *H04L 67/04* (2013.01); *H04M 1/72533* (2013.01); *G08C 2201/93* (2013.01); *H04M 1/72558* (2013.01); *H04W 84/12* (2013.01); *Y02D 30/40* (2018.01); *Y02D 70/142* (2018.01); *Y02D 70/144* (2018.01); *Y02D 70/166* (2018.01)

(58) Field of Classification Search
CPC ....... H04L 67/125; H04L 67/04; G06F 3/165; G08C 17/02; G08C 2201/93; H04M 1/72533; H04M 1/72558; Y02D 70/142; Y02D 70/144; Y02D 70/166; Y02D 30/40; H04W 84/12
USPC ............................................... 700/94
See application file for complete search history.

(56) References Cited

U.S. PATENT DOCUMENTS

| | | | | |
|---|---|---|---|---|
| 8,082,368 | B2 * | 12/2011 | Hsu ................. | H04L 43/0811 709/223 |
| 8,301,076 | B2 * | 10/2012 | Grandinetti ......... | G10H 1/0083 381/119 |
| 8,525,012 | B1 * | 9/2013 | Yang ................. | G10H 1/08 700/94 |
| 8,874,621 | B1 * | 10/2014 | Goodwin ......... | G06F 17/30292 707/756 |
| 9,094,636 | B1 * | 7/2015 | Sanders .............. | H04N 5/4403 |

(Continued)

FOREIGN PATENT DOCUMENTS

| | | |
|---|---|---|
| CN | 102574469 A | 7/2012 |
| CN | 104156217 A | 11/2014 |

(Continued)

*Primary Examiner* — Paul C McCord
(74) *Attorney, Agent, or Firm* — Seed IP Law Group LLP

(57) ABSTRACT

A recording/reproducing apparatus with a wireless LAN function. The recording/reproducing apparatus has a Wi-Fi module and establishes a Wi-Fi connection with a smartphone, and the like. When the Wi-Fi connection with a smartphone is established, the recording/reproducing apparatus automatically extinguishes a display, thereby curtailing power consumption. In addition, the display is extinguished, and an operating status of the display is transmitted to the smartphone by way of the Wi-Fi connection.

8 Claims, 3 Drawing Sheets

(56) References Cited

U.S. PATENT DOCUMENTS

| | | | |
|---|---|---|---|
| 9,111,519 B1* | 8/2015 | Yang | G10H 1/40 |
| 2004/0179135 A1* | 9/2004 | Battles | H04N 1/00127 |
| | | | 348/373 |
| 2004/0202291 A1 | 10/2004 | Skinner | |
| 2007/0142944 A1* | 6/2007 | Goldberg | G10H 1/0025 |
| | | | 700/94 |
| 2008/0045140 A1* | 2/2008 | Korhonen | H04M 1/7253 |
| | | | 455/3.06 |
| 2008/0077261 A1* | 3/2008 | Baudino | H04H 20/63 |
| | | | 700/94 |
| 2008/0249644 A1* | 10/2008 | Jehan | G11B 27/038 |
| | | | 700/94 |
| 2010/0259682 A1* | 10/2010 | Unger | H04N 21/4122 |
| | | | 348/569 |
| 2011/0248912 A1* | 10/2011 | Chen | G06F 1/1601 |
| | | | 345/156 |
| 2012/0131321 A1* | 5/2012 | Jitkoff | G06F 1/3203 |
| | | | 713/2 |
| 2012/0258702 A1 | 10/2012 | Matsuyama | |
| 2012/0268404 A1 | 10/2012 | Kuhn et al. | |
| 2014/0254820 A1* | 9/2014 | Gardenfors | H04R 3/005 |
| | | | 381/80 |
| 2015/0063816 A1* | 3/2015 | Papakos | H04J 14/021 |
| | | | 398/83 |
| 2016/0097801 A1* | 4/2016 | Polland | G01R 31/04 |
| | | | 324/538 |
| 2016/0139657 A1* | 5/2016 | Brooks | G06F 1/3228 |
| | | | 713/323 |

FOREIGN PATENT DOCUMENTS

| | | |
|---|---|---|
| JP | 10-051953 A | 2/1998 |
| JP | 2985200 B2 | 11/1999 |
| JP | 2004-88762 A | 3/2004 |
| JP | 2004-186770 A | 7/2004 |
| JP | 2007-142611 A | 6/2007 |
| JP | 2007-159057 A | 6/2007 |
| JP | 4522526 B2 | 8/2010 |
| JP | 3179256 U | 10/2012 |
| JP | 2012-222435 A | 11/2012 |

* cited by examiner

RECORDING/REPRODUCING APPARATUS WITH WIRELESS LAN FUNCTION

PRIORITY INFORMATION

This application claims priority to Japanese Patent Application No. 2014-256193 filed on Dec. 18, 2014, which is incorporated herein by reference in its entirety.

FIELD

The present invention relates to a recording/reproducing apparatus and, more particularly, to a recording/reproducing apparatus with a LAN function.

BACKGROUND

Techniques for extinguishing a display section under specific conditions have hitherto been proposed to save power of a portable device.

JP H10-051953 A discloses extinguishing a display section when a device is inoperative in order to save power of a main body of a device.

JP 2985200 B mentions extinguishing a display section at the time of recording or reproducing operation.

JP 4522526 B mentions that a display section is extinguished when an operation switch is locked by means of a hold function.

JP 3179256 U mentions a technique, though it is not a technique pertaining to extinction of a display section, of using a smartphone as a display device and a touch control terminal of a car audio system and controlling the car audio system by means of the smartphone through a wireless communication.

According to JP H10-051953 A, the display section stays lit up at all times when the recording/reproducing apparatus is in operation, which hence raises a problem of a poor power-saving effect being yielded during operation of the recording/reproducing apparatus.

According to JP 2985200 B, the display section is shut off even in the middle of recording or reproducing operation. Hence, a great power-saving effect is achieved during operation. In the meantime, there arises a problem of difficulty being encountered in ascertaining an operating status during operation after extinction of the display section.

As stated in JP 4522526 B, a conceivable way is to display time information for a predetermined period by operation of a switch. However, repeated illumination and extinction of the display section of the display section will cause erroneous operation or faulty operation as well as noise.

SUMMARY

The present invention provides a recording/reproducing apparatus that saves power by extinguishing a display section even in operation and that enables the user to easily ascertain an operating status even when the display section stays extinguished.

A recording/reproducing apparatus with a wireless LAN function according to the present invention includes: an input section for inputting an audio signal; a processing section configured so as to record the audio signal on a recording medium and reproduce the audio signal recorded in the recording medium; a display section for displaying information about a recording or reproducing status of the processing section; and a wireless LAN module. The processing section controls the display section from an illuminated state to an extinguished state when the wireless LAN module and a portable device are wirelessly connected, and also transmits the recording or reproducing status information to the portable device by way of the wireless LAN module.

In one embodiment of the present invention, the processing section controls the display section from the extinguished state to the illuminated state when the wireless connection between the wireless LAN module and the portable device is disconnected. In another embodiment of the present invention, even when the wireless connection between the wireless LAN module and the portable device is disconnected, recording or reproducing the audio signal is maintained.

Moreover, a recording/reproducing apparatus with a wireless LAN function according to the present invention includes: an input section for inputting an audio signal; a processing section configured so as to record the audio signal in a recording medium and reproduce the audio signal recorded on the recording medium; a display section for displaying information about recording or playback status of the processing section; and a wireless LAN module. The processing section controls the display section from the illuminated state to the extinguished state and transmits information about the recording or reproducing status to the portable device by way of the wireless LAN module when the wireless LAN module and the portable device are wirelessly connected and when detecting that the portable device has initiated a predetermined application.

In one embodiment of the present invention, when the wireless connection between the wireless LAN module and the portable device is disconnected without detecting that the portable device has terminated the predetermined application, the processing section controls the display section from the extinguished state to the illuminated state.

In another embodiment of the present invention, even when the wireless connection between the wireless LAN module and the portable device is disconnected without detecting that the portable device has terminated the predetermined application, the processing section maintains recording or reproducing the audio signal.

According to the present invention, power is saved by extinguishing the display section even in operation, and the user can easily ascertain an operating status even when the display section stays extinguished.

The invention will be more clearly comprehended by reference to the embodiment provided below. However, the embodiment provided below are illustrative, and the scope of the invention is not limited to the embodiment.

BRIEF DESCRIPTION OF THE DRAWINGS

A preferred embodiment of the present invention will be described in detail by reference to the following drawings, wherein.

DETAILED DESCRIPTION

An embodiment of the present invention is hereunder described by reference to the drawings. However, the following embodiment is illustrative and does not limit the present invention.

Figure 1:
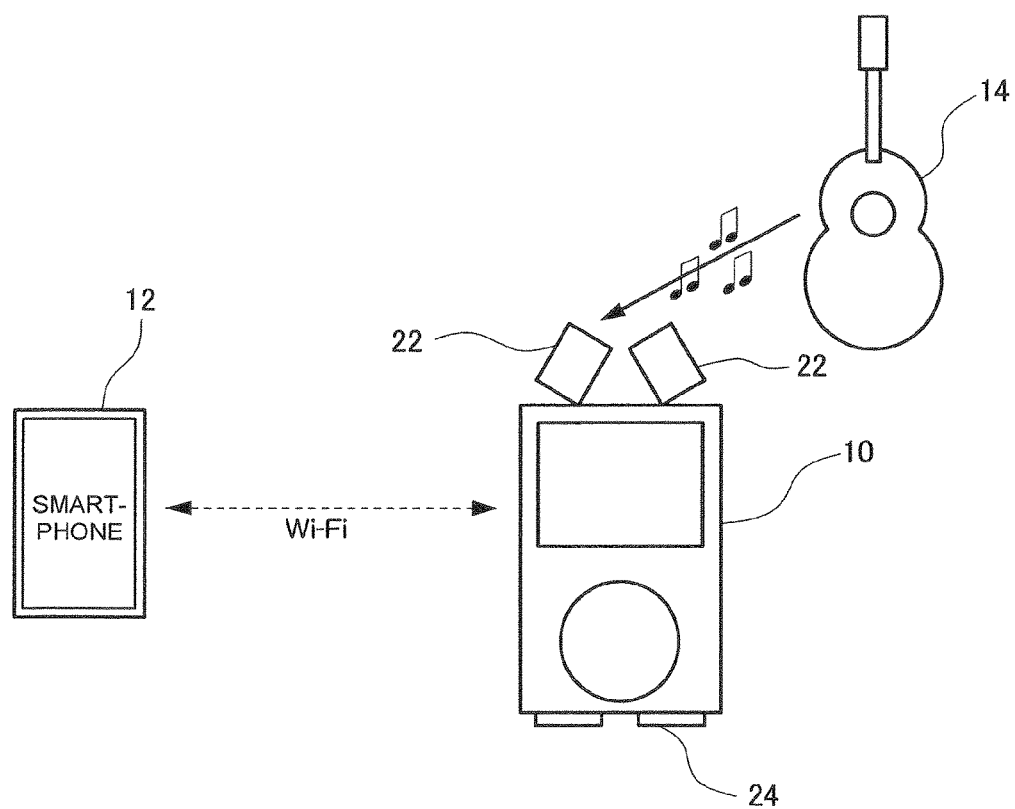
FIG. 1 is a system configuration diagram of an embodiment.

FIG. 1 is a system configuration diagram of the embodiment. A recording/reproducing apparatus 10 establishes a wireless connection with a portable device with a wireless connection function. In the present embodiment, a smartphone 12 is mentioned as the portable device with a wireless connection function, and a wireless LAN, more specifically a Wi-Fi connection, is mentioned as the wireless connection. A smartphone with a Wi-Fi communication function, such as a Wi-Fi module, has already been known and can be connected to the Internet by way of an access point of a wireless router, and others.

The recording/reproducing apparatus 10 has a known recording/reproducing function; processes an audio signal input from a built-in microphone 22 and a line input terminal 24; records the processed audio signal into an SD card, and others; reproduces the audio signal recorded in the SD card; and outputs it from a built-in speaker. In addition, the recording/reproducing apparatus 10 has a Wi-Fi module and establishes a Wi-Fi connection with the smartphone 12. The Wi-Fi connection between the recording/reproducing apparatus 10 and the smartphone 12 is basically a one-to-one connection; however, the connection may also be a one-to-many connection when necessary.

A user of the recording/reproducing apparatus 10 plays a desired musical part and inputs a desired audio signal to the built-in microphone 22 or the line input terminal 24 of the recording/reproducing apparatus 10, thereby recording sounds. FIG. 1 illustrates a part of a musical instrument 14, like a guitar, as a desired musical part. The musical part may also be an audio signal of an arbitrary part other than the guitar part; for instance, a base part, a vocal part, and a drum part. The recording/reproducing apparatus 10 inputs the audio signal generated by the musical instrument 14 and records the audio signal in the recording medium, such as an SD card, thereby recording sounds.

The smartphone 12 has a Wi-Fi communication function, such as a Wi-Fi module, and establishes a Wi-Fi connection with the recording/reproducing apparatus 10. The user initiates the predetermined application (an application required to monitor or control the recording/reproducing apparatus 10) and controls operation of the recording/reproducing apparatus 10 by operating the application. Specifically, the smartphone 12 is caused to function as a remote controller of the recording/reproducing apparatus 10 by operating the application and instructs the recording/reproducing apparatus 10 to start and stop recording operation, playback operation, and others.

The recording/reproducing apparatus 10 processes various commands sent from the smartphone 12 by way of the Wi-Fi connection, thereby performing recording or reproducing operation in response to the command. Establishment of the Wi-Fi connection with the smartphone 12 is taken as a trigger, whereupon the display section automatically shifts from an illuminated state to an extinguished state to diminish electric power consumed during operation.

Moreover, the recording/reproducing apparatus 10 automatically shifts the display section from the illuminated state to the extinguished state and transmits the operating state of the display section, or information about a recording or reproducing state (status information), to the smartphone 12 by way of the Wi-Fi. Accordingly, even when the display section of the recording/reproducing apparatus 10 is in an extinguished state, the user of the smartphone 12 visually confirms the screen of the smartphone 12, thereby being able to easily confirm the operating state of the recording/reproducing apparatus 10.

Figure 2:
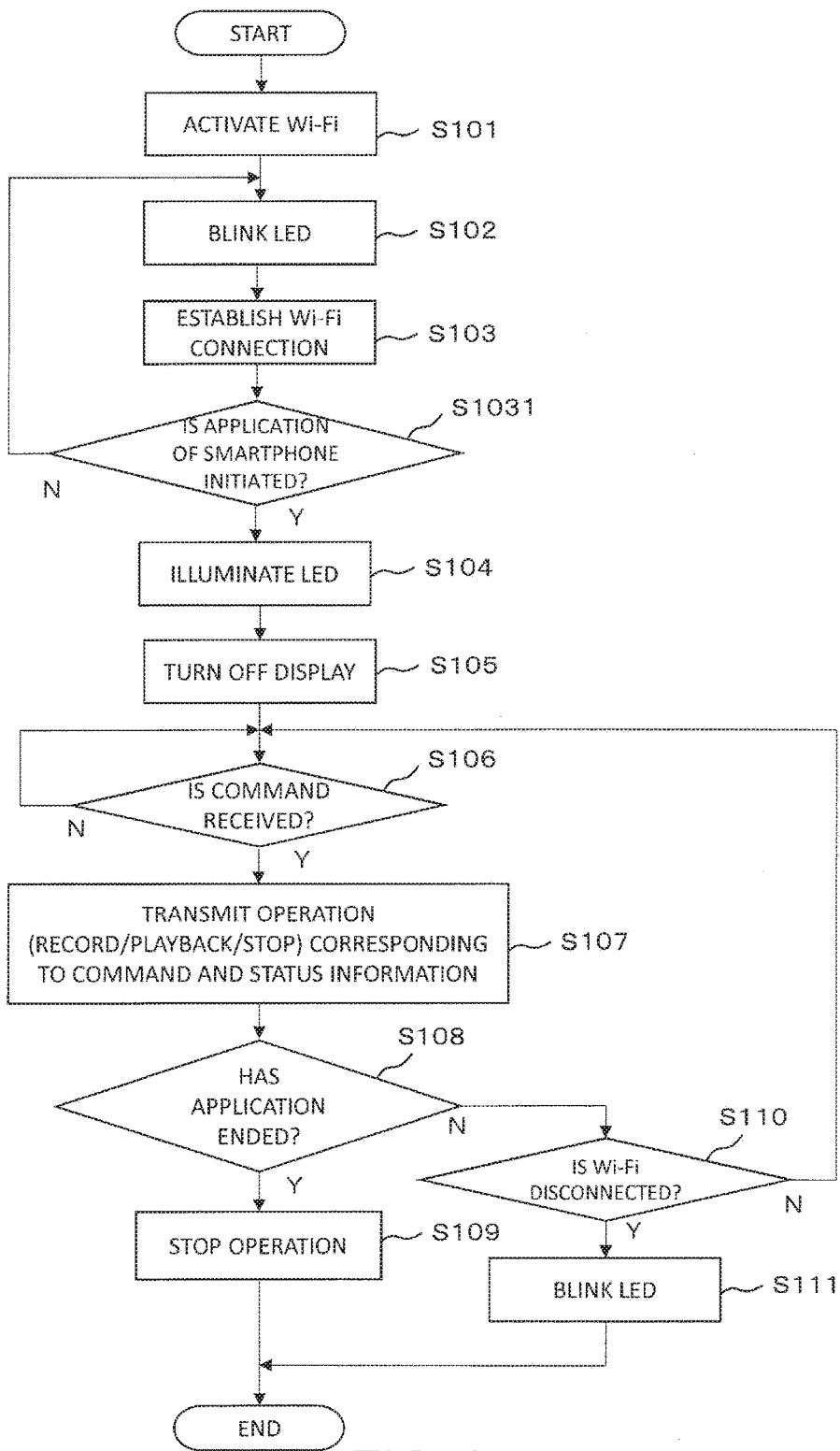
FIG. 2 is a processing flowchart of the embodiment.

FIG. 2 is a processing flowchart of the present embodiment.

First, the recording/reproducing apparatus 10 is placed at a desired location, and the power and Wi-Fi module of the recoding/reproducing apparatus 10 are activated (S101). Specifically, the Wi-Fi module is activated by operating the Wi-Fi button of the recording/reproducing apparatus 10. When the Wi-Fi module is activated, a Wi-Fi LED (hereinafter referred to simply as an "LED") of the recording/reproducing apparatus 10 blinks, showing that the recording/reproducing apparatus 10 is in a standby state (S102).

In the meantime, the user activates the Wi-Fi module by operating a Wi-Fi button or icon of the smartphone 12. When the smartphone 12 detects the recording/reproducing apparatus 10 and when an SSID, which is an ID of an access point in the wireless LAN of the recording/reproducing apparatus 10, is displayed, a password corresponding to the SSID is input to establish a Wi-Fi connection (S103). The password can also be displayed on the display section of the recording/reproducing apparatus 10 to prompt the user to visually confirm the password. The connection between the smartphone 12 and the recording/reproducing apparatus 10 can also be established by use of an NFC (Near Field Communication) technique.

When the recording/reproducing apparatus 10 establishes a Wi-Fi connection with the specific smartphone 12 and confirms initiation of a predetermined application in the specific smartphone 12 (S1031), the LED shifts from a blinking state to the illuminated state (S104). Establishment of the Wi-Fi connection between the recording/reproducing apparatus 10 and the smartphone 12 triggers the shift of the display from the illuminated state to the extinguished state (S105). Although various statuses of the recording/reproducing apparatus 10 are displayed on the display, power consumption can be curtailed by extinguishing the display, whereby consumption of a built-in battery can be inhibited. In this connection, even when the display is extinguished, the other modules (including the Wi-Fi module) of the recording/reproducing apparatus 10 still remain operating, the state of connection with the smartphone 12 is maintained as it is.

Next, when receiving a command from the smartphone 12 (YES in S106), the recording/reproducing apparatus 10 interprets the command and performs operation corresponding to the command (S107). The exemplification of commands includes a record start, a record pause, a record stop, a playback start, a playback stop, and others. Upon receipt of a record start command, the recording/reproducing apparatus 10 starts recording operation. Specifically, the audio signal input from the built-in terminal or the line input terminal is subjected to digital conversion processing, encoding processing, compression processing, and others, and subsequently recorded in a recording medium, like an SD card. The commands also include a display illumination command. When the received command is the illumination command, the recording/reproducing apparatus 10 correspondingly shifts the display from the extinguished state to the illuminated state.

When performing operation corresponding to the command, the recording/reproducing apparatus 10 transmits the status information to the smartphone 12 (S107). Status information achieved during recording include a sound record level, a time counter, a sound-recording track, and others. The status information achieved during playback includes the playback level, the time counter, a playback track, etc. As a matter of course, remaining capacity of the built-in battery can also be transmitted as status information.

The smartphone 12 receives the status information transmitted from the recording/reproducing apparatus 10, and the status information is displayed on the screen by the application. The user can ascertain the sound record level, a time, and others, by viewing the screen. When transmitting the record pause command or the recording stop command by operating the application, the recording/reproducing apparatus 10 pauses or stops sound-recording operation in response to the command.

When the user completes the application of the smartphone 12 (S108), the recording/reproducing apparatus 10 detects completion of the application, stopping the operation (S109). Specifically, if sound recording is in operation, the sound recording operation is stopped. If playback is in operation, the playback is stopped. The display also keeps extinguished. Incidentally, the Wi-Fi connection is maintained as it is. However, when the Wi-Fi connection is disconnected because the application enters a state of termination, the Wi-Fi connection is determined to be disconnected, so that the LED can also be extinguished. In this case, the recording/reproducing apparatus 10 can temporarily shift to a Wi-Fi connection standby state (LED blinking) and determine that the Wi-Fi has become disconnected after elapse of a predetermined time (a predetermined connection standby time) (LED extinguished).

When the application of the smartphone 12 is in operation, the recording/reproducing apparatus 10 determines whether or not the Wi-Fi connection is disconnected (S110). When the Wi-Fi connection is maintained, the recording/reproducing apparatus shifts to S106, where the recording/reproducing apparatus enters a standby state for receiving a command from the smartphone 12, transmitting the status information to the smartphone 12 while maintaining the display in an extinguished state. In the meantime, when the Wi-Fi connection is disconnected for any reason, the recording/reproducing apparatus 10 maintains its operating state as it is, blinking the LED (Sill). Even when the Wi-Fi connection is disconnected, the operating state is maintained as it is. The reason for this is that; for example, when sound recording is in operation, the audio signal is reliably recorded while the recording state is maintained without modification. Contrary to this, the reason why operation is stopped at the time of completion of the application is that the end of the application is considered to mean that the user has stopped operation of the recording/reproducing apparatus 10.

When the LED is blinked in S111, the display can also shift from the extinguished state to the illuminated state in addition to maintaining the extinguished state as it is. The reason for this is that the smartphone 12 cannot ascertain the status information about the recording/reproducing apparatus 10 as a result of disconnection of the Wi-Fi connection. Further, when a predetermined time (a predetermined connection wait time) has elapsed without re-establishment of the Wi-Fi connection or when the recording/reproducing apparatus 10 has stopped operation after the LED blinked in S111, the Wi-Fi-connection can also be determined to be disconnected, so that the LED can also be extinguished.

In processing shown in FIG. 2, the display of the recording/reproducing apparatus 10 is extinguished by taking the establishment of the Wi-Fi connection as a trigger. However, the display of the recording/reproducing apparatus 10 can also be extinguished by detecting initiation of the predetermined application in the smartphone 12 and taking the initiation of the application as a trigger.

Cooperation between the recording/reproducing apparatus 10 and the smartphone 12 and the state of the display of the recording/reproducing apparatus 10 are summarized as follows:

(1) when the Wi-Fi connection is disconnected, the display stays illuminated;

(2) when the Wi-Fi connection is established or the application is initiated, the display shifts from the illuminated stated to the extinguished state;

(3) when the Wi-Fi connection is maintained and when the application is in operation, the display stays extinguished; and (4) when the Wi-Fi connection is maintained and when the application ends, the display stays extinguished (or can also be illuminated).

The display is switched from the extinguished state to the illuminated stated when the smartphone 12 receives the illumination command, when illumination is instructed with the operation buttons 34 (see FIG. 3), or when the Wi-Fi connection is disconnected without terminating the application of the smartphone 12.

The state of illumination of the LED is as follows:

(1) when the Wi-Fi connection is disconnected, the LED stays extinguished;

(2) when the Wi-Fi connection is on standby, the LED blinks;

(3) when the Wi-Fi connection is established or when the application starts up, the LED is illuminated;

(4) when the Wi-Fi connection is maintained and when the application is in operation, the LED becomes illuminated; and (5) when the Wi-Fi connection is maintained and when the application ends, the LED is illuminated.

Next, a specific configuration of the recording/reproducing apparatus 10 of the present embodiment is described.

Figure 3:
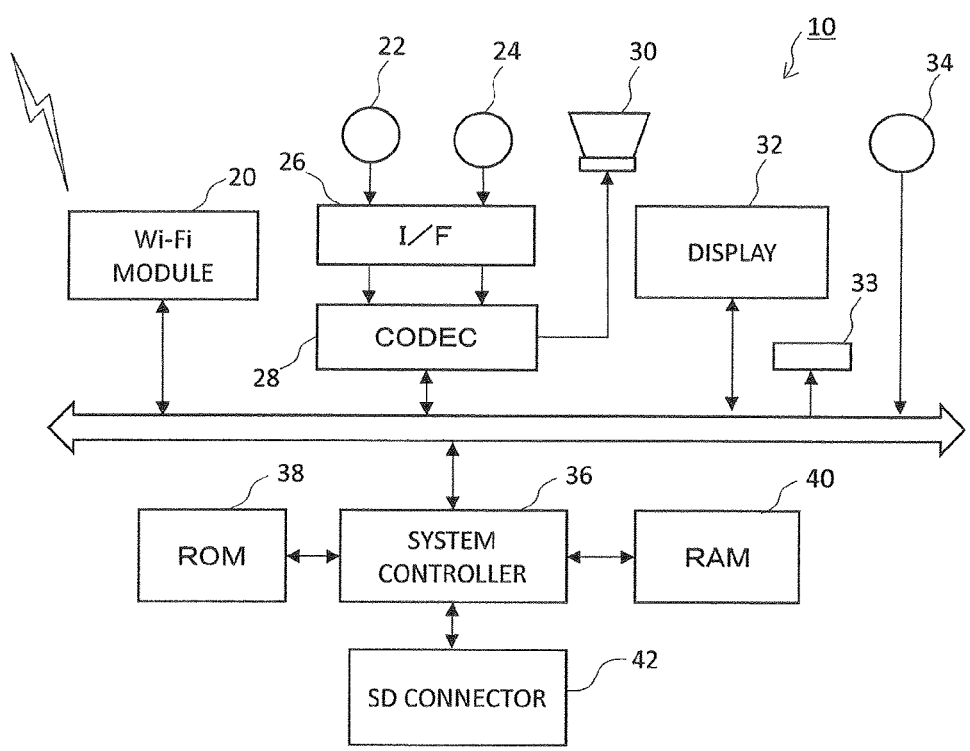
FIG. 3 is a configuration block diagram of a recording/reproducing apparatus of the embodiment.

FIG. 3 is a configuration block diagram of the recording/reproducing apparatus 10. The recording/reproducing apparatus 10 has a Wi-Fi module 20; a built-in microphone 22, a line input terminal 24, a built-in speaker 30, a display 32, an LED 33, the operation buttons 34, a system controller 36, and an SD connector 42.

The Wi-Fi module 20 is a wireless LAN module that establishes a Wi-Fi connection with and exchanges data with the smartphone 12. The Wi-Fi module 20 starts up in response to activation of the operation buttons 34, thereby establishing the Wi-Fi connection with the smartphone 12. In addition, the Wi-Fi module 20 receives a command from the smartphone 12, supplying the received command to the system controller 36. The command is one for controlling operation of the recording/reproducing apparatus 10; for instance, a record start, a record stop, and others. Further, the Wi-Fi module 20 transmits the status information supplied from the system controller 36 to the smartphone 12.

The built-in microphone 22 is a stereo microphone having an R channel and an L channel, inputs an audio signal generated by playing the musical instrument, and the like, and outputs the audio signal to an interface (I/F) 26.

The line input terminal 24 inputs the audio signal from an external device byway of a line input, outputting the audio signal to the interface (I/F) 26.

The interface (I/F) 26 outputs the audio signal from the built-in microphone 22 or the line input terminal 24 to a codec (CODEC) 28.

The codec (CODEC) 28 converts an input audio signal into a digital signal, compresses and encodes the signal, and outputs the audio signal to the system controller 36. In addition, the codec 28 expands and decodes the audio signal supplied from the system controller 36 and converts the thus-decoded signal into an analog audio signal, outputting the analog audio signal from the built-in speaker 30. The codec (CODEC) 28 can also be separated into a module for processing the audio signal from the built-in microphone 22 or the line input terminal 24 and another module for processing the audio signal to be output to the built-in speaker 30.

The display 32 is built from an LCD panel, an organic EL panel, and the like, and displays various types of status information about the recording/reproducing apparatus 10; for instance, a record/playback time counter and a sound-record level. In accordance with a control signal from the system controller 36, the display 32 shifts to an illuminated state or an extinguished state.

The LED 33 shows a started state and a connected state of the Wi-Fi module 20. When the Wi-Fi module 20 is OFF, the LED 33 stays extinguished. When the Wi-Fi module 20 is ON, the LED 33 stays blinking (standby state). When the Wi-Fi module 20 is ON and when the Wi-Fi connection is maintained, the LED 33 shifts to a connected and illuminated state.

The operation buttons 34 are for instructing operation of the recording/reproducing apparatus 10. The operation buttons 34 include a Wi-Fi button for switching the Wi-Fi between ON and OFF, a recording/playback/stop button, a sound record level adjustment button, a track selection button, and others. The operation buttons 34 can also be configured as a jog dial or touch buttons on the display 32. Even when the recording/reproducing apparatus 10 and the smartphone 12 are Wi-Fi connected and when operation of the recording/reproducing apparatus 10 can be controlled by the application of the smartphone 12, the operation buttons 34 are continually set to an enabled state (active state). Specifically, the system controller 36 interprets a command from the smartphone 12 and also accepts an instruction from the operation buttons 34 simultaneously.

The system controller 36 is made up of a processor and memory, and controls respective sections of the recording/reproducing apparatus 10. In accordance with the processing program recorded in the ROM 38, the system controller 36 performs various kinds of processing by using RAM 40 as working memory. Processing includes the activation/deactivation of the Wi-Fi module 20, establishing the connection with the smartphone 12, processing the audio signal input from the built-in microphone 22 or the line input terminal 24, recording the audio signal into the SD card, reproducing the audio signal, supplying status information to the Wi-Fi module 20, controlling the illumination/extinction of the display 32, illuminating/blinking/extinguishing the LED 33, and processing responsive to operation of the operation buttons 34. The system controller 36 can also have a plurality of processors or work in cooperation with a PLD (programmable logic device).

The SD card is inserted into the SD connector 42. The system controller 36 performs sound recording by recording the audio signal into the SD card. Moreover, the audio signal recorded in the SD card is read and output from the built-in speaker 30 by way of the codec (CODEC) 28.

In response to operation of the operation buttons 34, the system controller 36 starts the Wi-Fi module 20, thereupon blinking the LED 33. When establishing the connection with the smartphone 12 by means of the Wi-Fi module 20, the system controller 36 shifts the display 32 from the illuminated state to the extinguished state, and also shifts the LED 33 from the blinking state to the illuminated state. Incidentally, the system controller 36 can also detect initiation of the application in the smartphone 12 by receiving a start command from the smartphone 12 and shift the display 32 from an illuminated state to an extinguished state. Further, the system controller 36 receives a command from the smartphone 12, performing a record start, a record stop, a playback start, or the like, corresponding to the command. Further, upon receipt of the display illumination command, the system controller 36 shifts the display 32 from the extinguished state to the illuminated state.

As above, according to the present embodiment, the display 32 is extinguished by taking, as a trigger, the establishment of the Wi-Fi connection with the smartphone 12 or initiation of the application in the smartphone 12. Hence, power consumed by the recording/reproducing apparatus 10 can be reduced. Further, the status of the recording/reproducing apparatus 10 is transmitted to the smartphone 12 in conjunction with extinction of the display 32. Hence, even when the display 32 of the recording/reproducing apparatus 10 is in an extinguished state, the user can easily ascertain the operating status of the recording/reproducing apparatus 10 on the screen of the smartphone 12. Thus, operability is superior.

The present embodiment illustrates the Wi-Fi connection as a wireless connection. However, Bluetooth (a registered trademark), or the like, can also be used.

The invention claimed is:

1. A sound recording system comprising:
  a portable device; and
  a plurality of sound recording apparatuses, wherein each of the recording apparatuses includes:
    an input which, in operation, inputs an audio signal;
    an analog to digital (A/D) converter which, in operation, converts the audio signal into a digital signal;
    a manually operable button which, in operation, sets a mode of the sound recording apparatus to one of the access point mode and the client mode;
    a first processor which, in operation, operates as an access point of a wireless LAN or a client of the wireless LAN based on the mode set by the manually operable button, records the digital signal on a recording medium, and reproduces the digital signal recorded in the recording medium;
    a light emitting device which, in operation, emits light;
    a display device which, in operation, displays information about a recording or reproducing status of the first processor; and
    a first wireless Local Area Network (LAN) module which, in operation, performs wireless communications,
  wherein the first processor, in response to activating the first wireless LAN module, controls the light emitting device to be in a blinking state,
  wherein the first processor, in response to detecting that the first wireless LAN module and a portable device are wirelessly connected, controls the light emitting device to transition from the blinking state to an illuminated state, controls the display device to transition from the illuminated state to an extinguished state, and transmits the recording or reproducing status information to the portable device by way of the first wireless LAN module, and
  wherein first the processor, in response to detecting that the first wireless LAN module and the portable device are no longer wirelessly connected, controls the light emitting device to transition from the illuminated state to the blinking state and controls the display device to transition from the extinguished state to the illuminated state, and wherein the first processor of one of the recording apparatuses operates as the access point of the wireless LAN and the first processor of one or more remaining recording apparatuses operate as one or more clients of the wireless LAN, wherein the first processor of the one of the recording apparatuses that operates as the access point of the wireless LAN performs a Dynamic Host Configuration Protocol (DHCP) process that imparts one or more addresses to the one or more recording apparatuses that operate as the one or more clients of the wireless LAN, and reports the one or more addresses imparted by the DHCP process to the portable device, and wherein the portable device includes:

a second wireless LAN module which, in operation, receives status information; and a second processor which, in operation, causes the second wireless LAN module to wirelessly transmit a command to the first processor of the one of the recording apparatuses that operates as the access point of the wireless LAN and causes the status information received by the second wireless LAN module to be displayed on a display, wherein the first processor of the one of the recording apparatuses operating as the access point of the wireless LAN performs a sound recording operation in response to the command wirelessly transmitted from the second wireless LAN module and causes the first LAN module to transmit recording-in-operation status information to the second LAN module, and wherein the first processor of each of the one or more recording apparatuses operating as one of the one or more clients of the wireless LAN performs sound recording in response to the command wirelessly transmitted from the second wireless LAN module by way of the first processor of the one of the recording apparatuses operating as the access point of the wireless LAN, and causes the first wireless LAN module to wirelessly transmit recording-in-operation status information to the second processor using the one or more addresses imparted by the DHCP process by way of the first processor of the one of the recording apparatuses operating as the access point of the wireless LAN.

2. The sound recording system according to claim 1, wherein, when the first processor detects that the first wireless LAN module and the portable device are no longer wirelessly connected, the first processor controls the display device from the extinguished state to the illuminated state.

3. The sound recording system according to claim 2, wherein, when the first processor detects that the first wireless LAN module and the portable device are no longer wirelessly connected, recording or reproducing of the audio signal is maintained.

4. A sound recording system comprising:

a portable device; and a plurality sound recording apparatuses, wherein each of the sound recording apparatuses includes:

an input which, in operation, inputs an audio signal;

an analog to (A/D) converter which, in operation, converts the audio signal into a digital signal;

a manually operable button which, in operation, sets a mode of the sound recording apparatus to one of the access point mode and the client mode; and a first processor which, in operation, operates as either an access Joint of a wireless LAN or a client of the wireless Lan based on the mode set by the manually operable button, records the digital signal in a recording medium, and reproduces the digital signal recorded on the recording medium;

a light emitting device which, in operation, emits light;

a display device which, in operation, displays information about recording or playback status of the processing section; and first wireless Local Area Network (LAN) module which, in operation, performs wireless communications, wherein the first processor, in response to activating first the wireless LAN module, controls the light emitting device to be in a blinking state, wherein the first processor, in response to detecting that the first wireless LAN module and a portable device are wirelessly connected and detecting that the portable device has initiated a predetermined application, controls the light emitting device to transition from the blinking state to an illuminated state, controls the display device to transition from the illuminated state to an extinguished state, and transmits information about the recording or reproducing status to the portable device by way of the first wireless LAN module, and wherein the first processor, in response to detecting that the first wireless LAN module and the portable device are no longer wirelessly connected, controls the light emitting device to transition from the illuminated state to the blinking state and controls the display device to transition from the extinguished state to the illuminated state wherein the first processor of one of the recording apparatuses operates as the access point of the wireless LAN and the first processor of one or more remaining recording apparatuses operate as one or more clients of the wireless LAN, wherein the first processor of the one of the recording apparatuses that operates as the access point of the wireless Lan performs a Dynamic Host Configuration Protocol (DHCP) process that imparts one or more addresses to the one or more recording apparatuses that operate as the one or more clients of the wireless LAN, and reports the one or more addresses imparted by the DHCP process to the portable device, and wherein the portable device includes:

a second wireless LAN module which, in operation, receives status information; and a second processor which, in operation, causes the second wireless LAN module to wirelessly transit a command to the recording apparatuses, and causes the status information received by the second wireless LAN to be displayed on a display.

5. The sound recording system according to claim 4, wherein, when the first processor detects that the first wireless LAN module and the portable device are no longer wirelessly connected without detecting that the portable device has terminated the predetermined application, the first processor controls the display device from the extinguished state to the illuminated state.

6. The sound recording system according to claim 5, wherein, even when the first processor detects that the first wireless LAN module and the portable device are no longer wirelessly connected without detecting that the portable device has terminated the predetermined application, the first processor maintains recording or reproducing of the audio signal.

7. The sound recording system according to claim 4, wherein the first processor of each of the recording apparatuses sets sound recording parameters in response to the command wirelessly transmitted from the second wireless LAN module.

8. The sound recording system according to claim 1, wherein:
  the first processor of the one of the recording apparatuses operating as the access point of the wireless LAN sets sound recording parameters in response to the command wirelessly transmitted from the second wireless LAN module; and
  the first processor of each of the one or more recording apparatuses operating as one of the one or more clients of the wireless LAN sets the sound recording parameters in response to the command wirelessly transmitted from the second wireless LAN module by way of the first processor of the one of the recording apparatuses operating as the access point of the wireless LAN.

* * * * *